Figure 1:
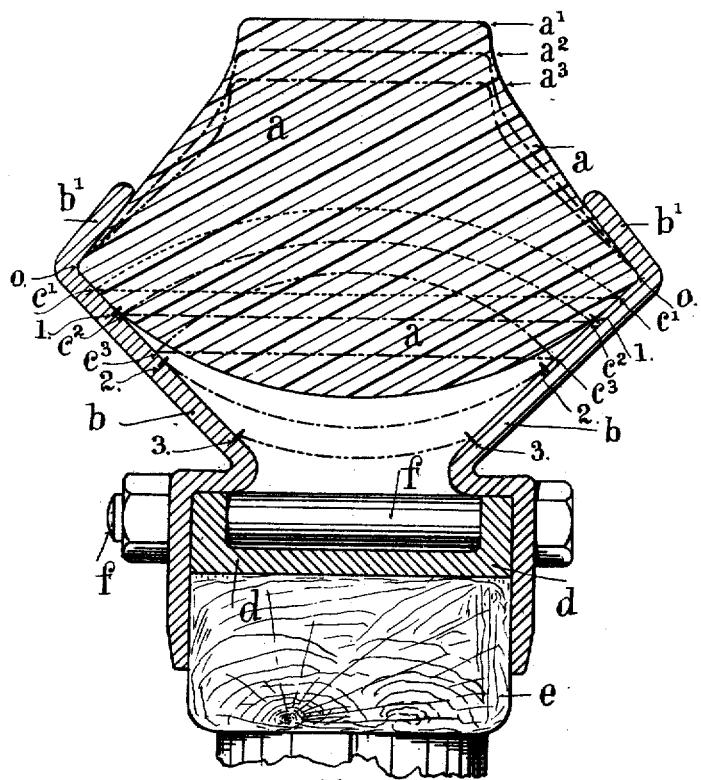

N. MACBETH.
TIRE.
APPLICATION FILED MAR. 5, 1908.

918,684.

Patented Apr. 20, 1909.
3 SHEETS—SHEET 1.

WITNESSES.

INVENTOR.
Norman Macbeth
By his Attorney

N. MACBETH.
TIRE.
APPLICATION FILED MAR. 5, 1908.

918,684.

Patented Apr. 20, 1909.
3 SHEETS—SHEET 2.

WITNESSES.
W. C. Burke
W. J. Kennedy.

INVENTOR.
Norman Macbeth.
By his Attorney

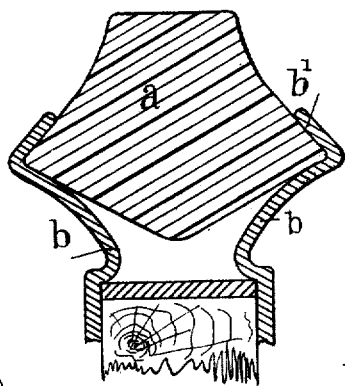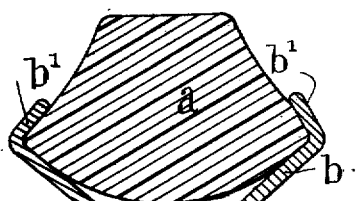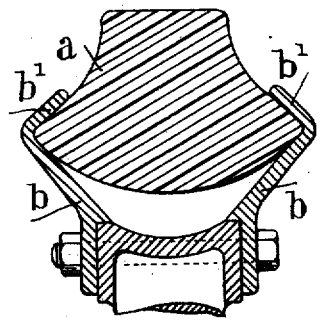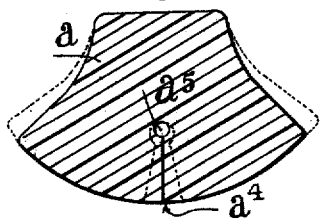

UNITED STATES PATENT OFFICE.

NORMAN MACBETH, OF DUNALLAN, ST. ANNES-ON-THE-SEA, ENGLAND.

TIRE.

No. 918,684.  Specification of Letters Patent.  Patented April 20, 1909.

Application filed March 5, 1908. Serial No. 419,255.

*To all whom it may concern:*

Be it known that I, NORMAN MACBETH, a subject of the King of Great Britain, residing at Dunallan, St. Annes-on-the-Sea, in the county of Lancaster, England, engineer, have invented new and useful Improvements in Tires, of which the following is a specification.

My said invention has reference to what are known as solid elastic tires and to rims for receiving the same and particularly concerns elastic tires and rims such as will serve for motor or other road vehicle wheels.

Although it has been proposed to make solid rubber tires with a flat or concave base, and to provide free space below the base of rubber tires so shaped, in the type of solid tire most generally known the solid rubber tire is bedded firmly into the rim and is continually supported across the width of the surface of the metal rim at the base thereof, that is to say, the base of the tire rests solidly and bodily on the metal rim whatever form of trough section the rim assumes. This being so it is obvious that any elasticity such a tire may possess is mainly due to the inherent resiliency of the body of rubber or elastic material of the tire, which projects outside of the rim and is not due to any particular way of holding or shaping the rubber tire and of shaping the channel of the rim wherein such tire is contained.

According to my invention not only do I avail myself of the inherent elasticity of rubber but I so hold the solid rubber tire in the rim, and shape such rim, and the tire, that I cause the rubber to develop or produce an elastic or resilient arch shaped area or field of compression, or what amounts to one, transversely of the rim, giving me an arc of compression which shortens its base or span in proportion to its height, as the load or road pressure increases and in this characteristic lies the important feature of novelty in my invention.

The new tire is a solid tire in the full sense of the term and apart from its inherent elasticity, can under pressure, collapse further, and gain additional inward movement or resiliency due to the collapsing, or tendency of the arc of compression to shorten its base or chord, in relation to its height, in proportion to the increased load. I thus gain additional resiliency, owing to the transverse compressibility of the tire, which I use to augment the effect of the inherent elasticity due to the substance of the tire which in an ordinary solid tire allows of radial compression only, and I reason from the fact, that, if a compressible body be disposed in arch form and held at two end points, extra resiliency, due to change of load, is developed above what would exist in such a body when solidly supported throughout the length of its base. In all cases I form the rubber tire so that it is solid under the compression from the flanges across the rim channel and having its base convex, or projecting inward somewhat beyond such transverse zone of compression from the flanges.

The figures in the drawings are illustrative of various types of tire and rim in accordance with my invention and it will be seen that the underlying principle or theory of construction disclosed in the preamble is present in the various modifications shown.

The exact way of shaping, clamping or attaching the rim sections to the wheel may vary considerably.

Figure 10:
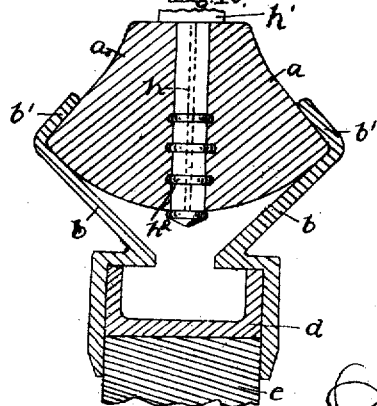
Figure 2:
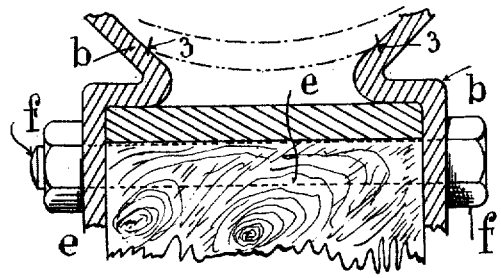
Figure 3:
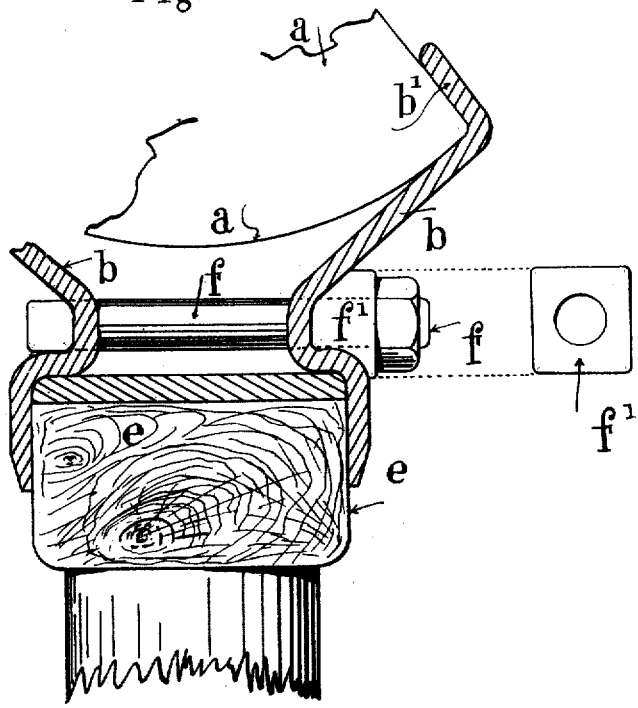

In the said drawings:—Figure 1 shows a sectional elevation of a good form of tire and rim, and also serves the purpose of a diagram explanatory of the principle upon which I propose to make solid tires for vehicles. In this case the base of the tire is convex. Fig. 2 shows a detail variation where the rim sections fit a felly with a plain metal hoop and the bolts pass through the felly. Fig. 3 shows a further detail variation in the rim sections and the way in which the transverse bolts clasp same. Fig. 4 shows a tire of an apex form at the base. Fig. 5 shows a tire with a convex or curved base seated in a rim having an angular trough or base. Fig. 6 is also a section of a tire with a convex base. Fig. 7 indicates a tire with curved or convex base seated in a wheel rim with a concave trough between the flanges. Fig. 8 shows a form of tire similar to Fig. 7 but in this case the wheel rim is constructed to accommodate twin tires. Fig. 9 is a section and indicates a tire split from the base or interior in the line of direction to and terminating toward the center of the tire so that the tire has a tendency to open or spread on either hand from the split. Fig. 10 shows another section of tire and rim where headed shanks or studs are driven into holes drilled or formed at intervals in the tire.

In carrying my invention into effect I in every case form a channel in the metal of the rim, or provide a channel in connection with the rim, and in all cases such rim has a gradual deepening or depression toward its center, and such rim has flanges. These flanges preferably project inward or overhang and their function is to provide side recesses or abutments on either hand. Such rims may be made in sections across the width, or the flange or flanges may be removable and be bolted to the wheel or otherwise secured to make up the rim.

The tire is so inserted and held in position that the extreme or lateral edges or faces are held in compression between the flanges or abutments on the rim and the tire is retained thereby. The tires are also so shaped and held that normally (and when not subjected to pressure on the road) they bear only upon the inner surfaces of the rim channel near the abutments or flanges and sufficient space is thus left between the center portion or inner surface of the elastic tire and the metal rim to allow the solid tire to be pressed inward to a considerable extent toward the center of the channel or rim, thus allowing of a considerable extra flattening of the outside periphery in contact with the road beyond what takes place in an ordinary solid tire. The essential requirements in tires and rims of my invention having been specified I will refer the reader to Fig. 1 of the drawing where a solid tire $a$ is shown clamped by two rim sections $b$, $b$, which have flanges $b'$, $b'$ to produce the lateral abutments necessary. The base of the tire $a$ under normal conditions only bears on the inner surfaces or walls of the rim channel near the flanges, that is, between the points 0-1. As already explained the abutments $b'$ $b'$ pinch or compress the tire $a$ and the remainder of the tire base being unsupported an elastic or resilient arch shaped field of compression is produced, the arc or curve of such arch being denoted by the curved dotted line $c'$ to $c'$ while the straight dotted line connecting the extremities indicates the chord of the supposed arch of compression. Under increasing road pressure the rubber tire collapses and the periphery sinks from the point $a'$ to $a^2$ and the tire gradually beds down upon the inner walls of the rim until the points 2 on either hand are reached, whereupon the dot and dash line proceeding from $c^2$ to $c^2$ becomes the supposed arc of compression and the straight dot and dash line connecting the extremities the chord of such arc. In like manner, as the periphery sinks to the point $a^3$, the tire collapses further until the base beds on either hand in the rim to the extent between the points 0-3, and, at such time, the double dot and dash line proceeding from $c^3$ to $c^3$ is the arc, and the straight double dot and dash line connecting the extremities $c^3$ to $c^3$ represents the chord. Even in this position the tire has still further room to collapse somewhat further into the channel produced by the form of built-up rim shown. As the tire gradually collapses the rubber rolls down to bed on the inner rim walls. It is also to be noted, that, as the tire collapses, the rubber walls extending from the abutments $b'$ $b'$ to the tire periphery tend to draw inward, as I seek to indicate by the broken lines, and consequently the rubber is not chafed at such points.

The rim sections $b$ $b$ are shown seated on an upturned channel section of metal $d$ attached to the felly $e$, the rim sections being firmly held by bolts $f$ passed through transversely at intervals. This is one obvious way among many.

The principle of construction and behavior of the tire explained with reference to Fig. 1 will now be fully appreciated and it is apparent that Figs. 2 to 10 merely indicate modifications either as to ways of clamping the rim sections, or with respect to the shape of the tires or rims, and particular detailed explanation of such is hardly necessary.

Figs. 2 and 3 indicate variations in the style of felly and the way of clamping the rim sections on. In Fig. 3 $f'$ indicates a distance block or washer which is used with each bolt.

Fig. 4 indicates a tire $a$ with an apex like base.

In Fig. 5 the tire $a$ has a convex base and is clamped between rim sections producing an angular channel.

The Figs. 6 and 7 show tires $a$ with convex bases and removable rim sections.

A form of wheel with twin tires is shown in Fig. 8 where the tires with convex bases are marked $a$ $a$ and are secured between fixed abutments $b^3$ forming part of the cast rim, and opposite abutments $b'$ on a removable rim section $b$ bolted in position as shown.

In the modification shown in Fig. 9 the solid tire $a$ is intended to be contained in a channel as before described but the tire though formed in one section or ring of rubber is split vertically about the center of its cross-section as for instance along the line $a^4$. Such vertical parting or split, however does not completely divide the tire into two sections but only extends about mid-way of the central depth of the tire and terminates in a channel or groove $a^5$ extending circumferentially throughout the rubber tire. Before the elastic tire is inserted between the containing flanges or abutments of the rim the split part may be open or gap to some extent, as the dotted lines indicate, the tire being closed under pressure of the flanges. The pressure of the compression between the flanges is borne normally by the part containing this split or division and when pressed together between the flanges the whole tire behaves as if it were one solid piece without the split. One object of the split is to relieve the rubber material from tensile strain at the inner surface of the tire when the tire is pressed inward under road pressure. The area or arch of compression due to the road pressure is acted upon as previously described, while the split part allows the inner surfaces of the tire to roll upon the inner surfaces of the rim without putting tensile strain on the rubber, as the split tends to open on the inner side as the load presses the tire inward. The elastic tires may be made in segments and not continuous circumferentially.

In the modification illustrated in Fig. 10 the tire is shaped or formed as hereinbefore described and is intended to be held in a rim shaped to accommodate and hold the same in accordance with my invention, and the tire is intended to be armored by studs or shanks $h$ with suitably shaped heads $h'$. The rubber tire $a$ is or may be formed solid and is bored at intervals, and the headed shanks are driven in, suitable locking means such as annular projections $h^2$ serving to retain the shanks once the same are inserted.

The rim sections, for confining and supporting the tire, may be formed in corresponding halves clamped on a trough, or one part of the rim may be bolted to the other part as is illustrated in Fig. 3.

I wish it to be clearly understood that the precise shape of rim or rim sections may vary as also the way of clamping or securing any such part or parts.

I declare that what I claim is.

1. An elastic tire having an inwardly projecting base and a narrowed periphery, and a rim engaging with the side extremities of the base of the tire, the bottom of the tire being spaced from the bottom of the rim.

2. An elastic tire having an inwardly extending base and a narrowed periphery, a rim having its walls diverging outwardly, convergent flanges at the outer edges of said walls, said walls and flanges gripping the side extremities of the base and the bottom of the tire being spaced from the bottom of the rim.

3. An elastic tire having an inwardly extending base and having the lower portion of each side projecting outwardly, a rim having portions gripping said projecting parts of the tire and the bottom of the tire being spaced from the bottom of the rim.

In testimony whereof I have signed my name to this specification in the presence of two subscribing witnesses.

NORMAN MACBETH.

Witnesses:
RICHARD IBBERSON,
JOSHUA ENTWISLE.